United States Patent [19]

Grant et al.

[11] Patent Number: 5,027,269

[45] Date of Patent: Jun. 25, 1991

[54] METHOD AND APPARATUS FOR PROVIDING CONTINUOUS AVAILABILITY OF APPLICATIONS IN A COMPUTER NETWORK

[75] Inventors: John D. Grant; James L. Hall, both of Raleigh; Barron C. Housel, III, Chapel Hill, all of N.C.

[73] Assignee: International Business Machines Corporation, Armonk, N.Y.

[21] Appl. No.: 344,333

[22] Filed: Apr. 27, 1989

[51] Int. Cl.5 .................... G06F 11/20; G06F 13/00
[52] U.S. Cl. ............................ 364/200; 364/222.2; 364/242.94; 364/285.1; 364/285.2; 371/9.1; 371/12
[58] Field of Search ............... 371/8.1, 8.2, 9.1, 12; 364/200, 222.2, 228.2, 242.94, 268.4, 269, 285.1, 285.2

[56] References Cited

U.S. PATENT DOCUMENTS

| | | | |
|---|---|---|---|
| 4,458,311 | 7/1984 | Clements et al. | 364/200 |
| 4,586,134 | 4/1986 | Norstedt | 364/200 |
| 4,751,702 | 6/1988 | Beier et al. | 371/9.1 |
| 4,791,566 | 12/1988 | Sudama et al. | 364/200 |
| 4,969,092 | 11/1990 | Shorter | 364/200 |

Primary Examiner—Charles E. Atkinson
Attorney, Agent, or Firm—John J. Timar

[57] ABSTRACT

A method and apparatus for maintaining active sessions between communicating logical units in a computer network when an application system fails without having to re-establish the active sessions. By activating a persistent sessions capability at one of the logical units, the active sessions can be suspended and maintained while attempts at recovery are made. Recovery attempts include restarting the failed application or switching the suspended sessions to an alternate instance of the logical unit. The suspended sessions are resynchronized with the application system and session activity is resumed.

21 Claims, 3 Drawing Sheets

FIG. 3

| STATES / SIGNALS | RESET (1) | LU ACTIVE/ PERSISTENT SESSIONS INACTIVE (2) | LU ACTIVE/ PERSISTENT SESSIONS ACTIVE (3) | RECOVERY PENDING (4) | RECOVERY-IN-PROGRESS/ PERSISTENT SESSIONS ACTIVE (5) | RECOVERY-IN-PROGRESS/ PERSISTENT SESSIONS INACTIVE (6) |
|---|---|---|---|---|---|---|
| OPEN | 2 | 2(ERR) | 5 | 5 | 5 | 6(ERR) |
| CLOSE | — | 1 | 4 | — | 4 | 1 |
| PERSIST | — | 3 | 3 | — | 5 | 5 |
| NPERSIST | — | 2 | 2 | — | 6 | 6 |
| REC COMP | — | — | — | — | 3 | 2 |
| TIMEOUT | — | — | — | 1 | — | — |

METHOD AND APPARATUS FOR PROVIDING CONTINUOUS AVAILABILITY OF APPLICATIONS IN A COMPUTER NETWORK

BACKGROUND OF THE INVENTION

1. Field of the Invention

The invention relates generally to computer networks and more particularly to a method for recovery from application system failure in order to provide continuous availability of the application system.

2. Prior Art

Prior art computer networks are controlled by a system architecture which insures the orderly flow of information throughout the system. Systems network architecture (SNA) is a system architecture developed by IBM Corporation which controls the configuration and operation of a computer communications network. It provides the description of the logical structure, formats, protocols, and operational sequences for transmitting information units through the network.

The network is composed of nodes interconnected by communications facilities. The nodes may be of widely varying functional capability, ranging from terminals with minimal native processing capability to complex multiprocessors. The communication facilities also come in a number of varieties ranging from high speed I/O channels to low speed, point-to-point telephone lines and including such media as satellite links and wide-band optical fibers.

Each node is comprised of a physical unit (PU) which controls the physical resources of the node (e.g., links) and one or more logical units (LU) which are used to partition, allocate, and control the devices associated with end-user communications.

The Virtual Telecommunication Access Method (VTAM) is a telecommunications access method software program, developed by IBM Corporation, which is resident in a host processor and provides an interface between the host processor and other resources in the computer network. A VTAM application program is a program that uses VTAM macro instructions to communicate with terminals. VTAM allows a plurality of application programs to be used at a single terminal. An application program within a host processor can be used at any location in the network without the program having any awareness of network organization.

Users in the network communicate by establishing a session between the logical units (LU) that represent them. A session involves a definition of the characteristics of the communication between two end-users. Each logical unit couples a user to the SNA network. Two logical units can have multiple logical connections or parallel sessions established between them.

Currently, when a network application fails, all of the sessions of the application are terminated (unbound). Application recovery requires the sessions to be re-established. This process is slow, thereby causing application recovery to take an unacceptably long time, especially if there was a large number of sessions.

Any fault tolerant solution requires two basic ingredients redundancy and state recording. Redundancy may come in the form of duplicate hardware and software, along with the appropriate access paths (e.g., busses, links, cache, etc.). State recording is a process of recording enough processing state information during normal processing such that when a fault occurs and recovery is invoked, a consistent "next" state can be constructed in order that the process can continue properly.

One solution to this problem has been to add additional hardware and software system elements to create an alternate application subsystem which is kept synchronized with the active subsystem. For example, an alternate processor with the same type of application program can establish back-up sessions for any of the sessions that the primary host processor has active currently. If the primary processor was unable to perform its function for any reason, such as hardware, operating system, VTAM or application failure, the alternate processor could be used immediately to service the users that had active sessions with the primary processor. A major drawback to this approach is that it requires purchase of redundant processor hardware and software. Moreover, a separate back-up session is required for each active session.

SUMMARY OF THE INVENTION

It is therefore an object of this invention to provide a method that addresses failure of a network application system by switching from the failing program to an alternate system or restarting the failed system, without having to re-establish all sessions.

It is a further object of this invention to provide a method for recovery from an application system failure that does not require that back-up sessions be established.

It is a still further object of this invention to provide a mechanism through which an alternate copy of an application can initiate a take-over before detection of a failure by the communications access method. This method can also be used to achieve a planned take-over.

The objectives of the present invention are achieved, in the event of an application failure, by the resident communications access method, e.g., VTAM, suspending the active sessions, maintaining session state information in memory outside the address space of the affected logical unit, and resuming the suspended sessions. This invention allows a failing application to recover either by restarting or by transferring control to an alternate copy. This method is embodied in the concept of a "persistent session" between logical units.

Several recovery alternatives are included in the present invention. Recovery can be achieved locally on the same operating system image or remotely on a different operating system image. One alternative is to restart the application on the same operating system after abnormal termination processing is complete. Another alternative is to start a copy of the application that runs under the same operating system before the failure but in a different address space (local alternate). The application copy can initiate recovery processing when it is signalled that the active application has failed or is in the process of failing. Remote recovery is required for catastrophic failure resulting from faults in the operating system, VTAM or the hardware; however, it can be used in any case for which local recovery is not desired (e.g., operating system maintenance). As with local recovery, the application can be restarted on the remote system after the failure. Likewise, recovery can be accomplished by transferring control to a previously started copy of the application on the remote system.

Some subsystem applications are not structured in a manner that allows local alternates for recovery. Thus, it is essential to restart the failed subsystem as fast as possible in order to minimize the outage to the end user. Persistent sessions enable sessions to be preserved across an application failure and during the subsequent restart. Reacquiring sessions during restart is extremely fast because costly session establishment is eliminated and no external flows are generated.

For applications that do permit local alternates for recovery, the local alternate is initialized and waiting to initiate recovery should the primary application fail. One key property of the persistent session is that the local alternate maintains the same name as the active logical unit. This enables any existing dependent tasks to easily re-establish linkages with the recovery logical unit and resynchronize without the need for monitoring additional sessions or requiring human intervention. Persistent sessions provide recoverability for all sessions, regardless of their logical unit types. Furthermore, both primary and secondary logical units can be recovered regardless of the manner in which the device containing the partner logical unit is attached to the network.

The persistent session capability is enabled as a VTAM feature by additional parameters on the statements used to define the application as a logical unit in the computer network. If the persistent session capability is used by an application logical unit, then all of its sessions inherit the "persistent" attribute.

When an application logical unit fails or an alternate logical unit initiates a take-over, the active sessions of the logical unit are disconnected from any application logical unit for some period of time. VTAM assumes responsibility for the active sessions from the time the failure is detected until the recovery (alternate) logical unit indicates that it is prepared to assume responsibilitY for the sessions. During the "outage", the sessions are suspended. Suspended sessions are in a recovery-pending state. An important observation is that activity may still occur on a suspended session, e.g., data may still be in transit. A suspended session is handled in such a way that the correct session state is maintained. This means that all session resources remain allocated and that the session states are tracked for future recovery actions (resynchronization).

Session tracking begins at the time the session is created and continues until the session is terminated, continuing even when a session is suspended. During session tracking, VTAM saves the session state information for each data request unit (RU) sent or received on the session. This is necessary because the current session state must be passed to the recovery logical unit when it assumes responsibility for the session. In addition, a correct session protocol must be preserved in order to prevent session termination due to a protocol error.

If an application fails and subsequently attempts to recover via restart or a local alternate and the recovery processing fails, the application can deactivate the persistent session capability during the recovery interval so that normal termination processing can be executed. Subsequently, after application recovery is complete, the persistent session capability is again activated to guard against subsequent application failures. To ensure that sessions are not suspended indefinitely due to failure and recovery procedures, a safety timer is required so that eventually, session clean-up can be executed.

VTAM provides three additional notifications to a network session monitor to reflect the recovery status of persistent sessions: 1. recovery pending—this indicates that sessions for a given application logical unit have been suspended but no alternate logical unit has been initiated to resume session activity; 2. recovery in progress—this indicates that an alternate logical unit is active, but not all sessions have been processed; 3. recovery complete—this indicates that all sessions have been recovered. The session monitor is a function of a network management program as exemplified by the IBM software product NetView TM.

In the basic embodiment of the persistent session capability, although session states are tracked and preserved, the actual application (RU) data can be discarded. Discarding the data will, in many cases, lead to a lack of failure transparency to the end user. In an alternate embodiment, instead of discarding application data during the outage period, the data can be queued for subsequent delivery to the recovered application.

BRIEF DESCRIPTION OF THE DRAWINGS

FIG. 3 is a table showing state transitions in a persistent session FSM.

DETAILED DESCRIPTION OF THE PREFERRED EMBODIMENT

Figure 1A:
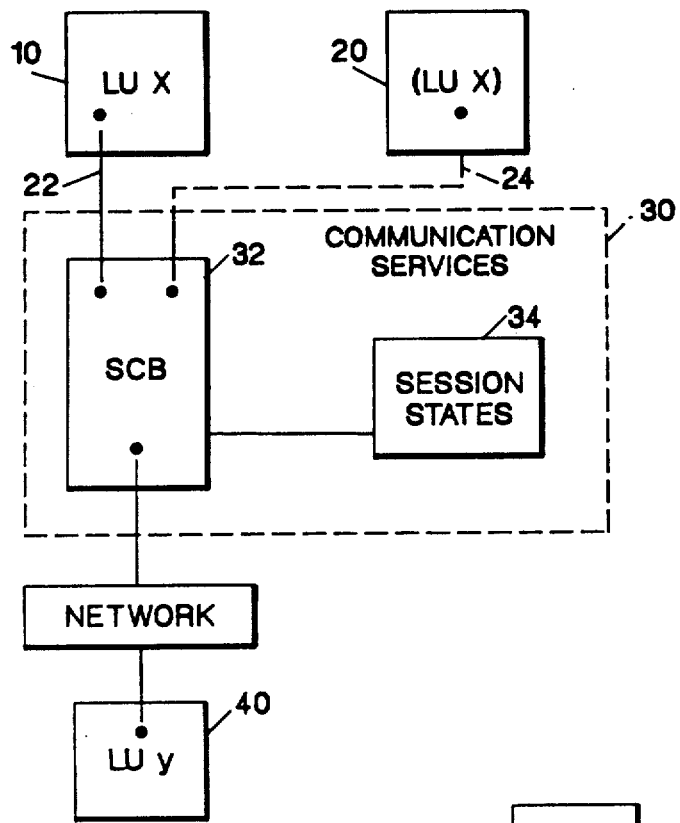
FIG. 1A shows a logical unit to logical unit connection before a logical unit fails.
Figure 1B:
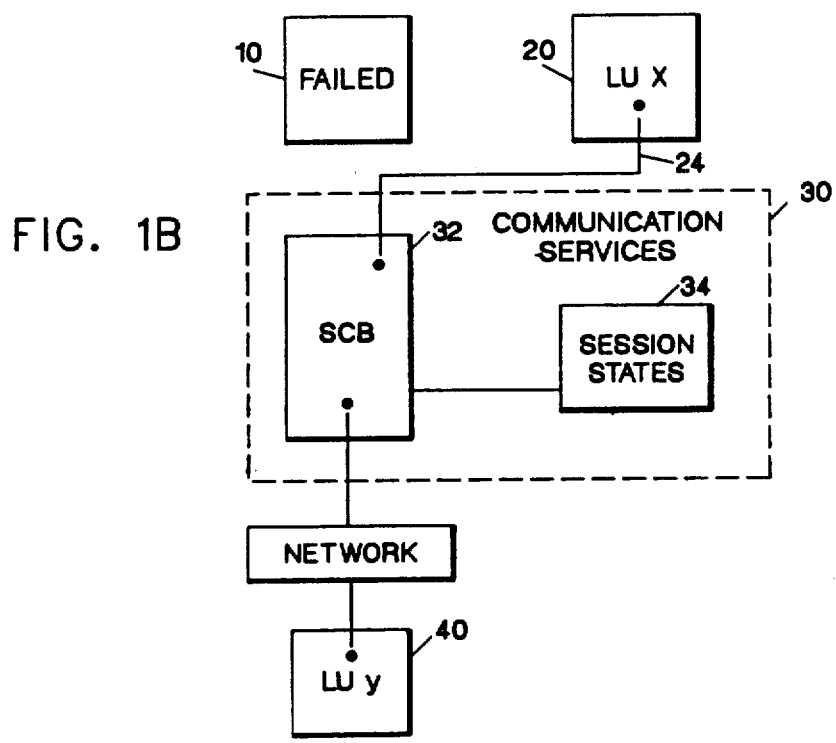
FIG. 1B shows an alternate logical unit to logical unit connection after recovery takes place.

Referring to FIGS. 1A and 1B, there is shown a logical representation of a computer network. A session is depicted from LUx in address space 10 to LUy in address space 40. The labeled boxes represent address spaces in which the application LUs execute. In the communication services component 30, a session control block (SCB) 32 and memory 34 for recording the session state information are maintained. Address space 20 depicts a recovery (alternate) instance for LUx. The connection labeled 22 in FIG. 1A depicts the session appearance in address space 10 when processing is proceeding normally. When LUx fails in address space 10, connection 22 is broken. Connection 24 as shown in FIG. 1A does not exist as long as the active LUx in address space 10 executes normally. If the active LUx fails, however, and another instance of LUx is started or triggered to perform application recovery, then the recovering LUx instance in address space 20, invokes the communication services 30 to resume the session between LUx and LUy, resulting in connection 24 as shown in FIG. 1B.

Depending on the type of recovery, address space 20 can be viewed as a restarted version of LUx in address space 10, as another address space that contains a local alternate, or as an alternate in another host system. In the latter case, the connection between the communication services 30 and the address space that contained the active logical unit requires a communication access via a channel, bus, or high speed link. When LUx in address space 10 fails, communications services 30 maintains the session resource (SCB) 32 and continues to keep the session status current. Thus, during the entire outage period, the state of the session from the viewpoint of the network is correctly maintained. Since the application LU in address space 10 has failed, information relating activity on the session with the application state may have been lost. During recovery, the application issues communications services 30 commands to retrieve the session states, resume ownership of the session, and resynchronize the session with the application state.

VTAM will track and retain information on each LU-LU session established by an application after the application opens an access method control block (ACB) for which persistent sessions have been specified. If persistence has not been started by an application and the ACB is closed, all LU-LU sessions with that application will be terminated in the same way as currently. However, if persistence has been started and the ACB is closed, these sessions will not be terminated. Instead, VTAM suspends the sessions and waits for the application to recover. It also notifies the session monitor that recovery is pending and activates a safety timer if one has been specified by the application. If the application cannot recover (i.e., reopen its ACB) before the timer expires, all suspended sessions are terminated. LU-LU data received by VTAM while a session is suspended will be queued.

After the application has recovered and reopened its ACB, VTAM indicates that the application is persistent and informs the session monitor that recovery is in progress. The application requests information about the suspended sessions from VTAM and specifies on a per-session basis whether or not each session is to continue. If the indication is to continue, the session reverts to the active state. If the indication is not to continue, the session is terminated. After the last suspended session becomes active or is terminated, the session monitor is notified that a recovery is complete.

Figure 2:
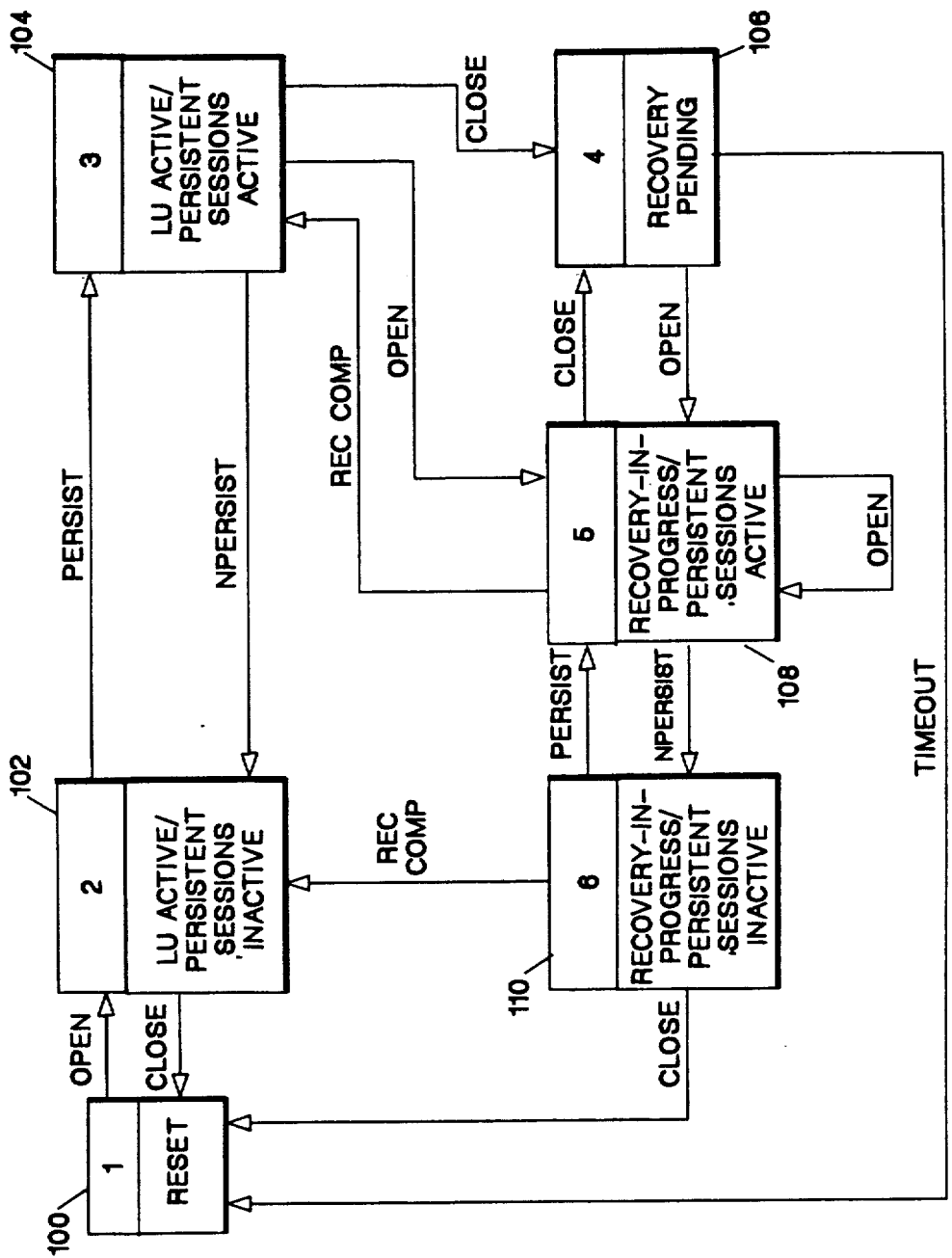
FIG. 2 is a graph of the persistent session finite state machine (FSM).

FIG. 2 describes the persistent session capability in terms of a finite state machine (FSM) graphic representation. FIG. 3 describes persistent session capability in terms of a FSM table representation wherein the numbers in the table represent the next state to which the current state transitions. The persistent session FSM consists of six states and six signals. The six states are as follows: RESET; LOGICAL UNIT ACTIVE/PERSISTENT SESSIONS INACTIVE; LOGICAL UNIT ACTIVE/PERSISTENT SESSIONS ACTIVE; RECOVERY PENDING; RECOVERY-IN-PROGRESS/PERSISTENT SESSIONS ACTIVE; RECOVERY-IN-PROGRESS/PERSISTENT SESSIONS INACTIVE. The six signals are OPEN, CLOSE, activate persistent sessions (PERSIST), deactivate persistent sessions (NPERSIST), recovery complete (REC COMP), and time out (TIMEOUT). The OPEN signal connects the application to the communications services component; the CLOSE signal disconnects the application. The six states are represented by blocks in FIG. 2 with the top part of each block containing a state number from 1 to 6, and the lower part of each block containing a state description. In FIG. 3, the current state is labeled at the top of each column by a state number and state description.

There are two categories of processing associated with a finite state machine, i.e., processing associated with a given state and processing associated with a transition from one state to another. Referring now to FIG. 2 and the persistent session FSM table in FIG. 3, the basic states and transitions will be explained. The state transition processing for a given state transition is labeled by the signal above each directed arrow. State 1, the RESET state, represented by block 100 is a state before the persistent session logical unit is active. The OPEN signal results in initial processing of an access method control block and the setting up of VTAM for session tracking. The only transition from RESET is to state 2, block 102, which represents the LOGICAL UNIT/PERSISTENT SESSIONS INACTIVE state. As the state name implies, the logical unit is active but the persistent sessions capability is still inactive. The application may create, use and terminate sessions. All active sessions are tracked while in this state, but the logical unit will terminate if a CLOSE signal is issued. The termination close processing results in the unbinding of all sessions for this logical unit and the cleaning up of resources for this logical unit. A CLOSE signal returns the FSM representation to the RESET state, block 100. From block 102 (state 2), a PERSIST signal will cause a transition to block 104 (state 3) which represents the LOGICAL UNIT ACTIVE/PERSISTENT SESSIONS ACTIVE state and enables subsequent OPEN signals in case a take-over is required. An OPEN signal issued from state 2 will result in an error signal (FIG. 3) that indicates an access method control block (ACB) is already open and will cause a return to the same state. In state 3, LOGICAL UNIT ACTIVE/PERSISTENT SESSIONS ACTIVE, block 104, the application may create, use and terminate sessions. In this state all active sessions are tracked. Since the persistent sessions capability is enabled, if the application is terminated or another OPEN signal is issued for this logical unit, all active sessions are preserved. Three signals can be issued when in this state, namely, OPEN, CLOSE, and deactivate persistent sessions (NPERSIST). The NPERSIST signal disables the persistent session function thereby causing a transition to block 102 (state 2) LOGICAL UNIT ACTIVE/PERSISTENT SESSIONS INACTIVE.

If an OPEN signal is issued in state 3, there is a transition to state 5, RECOVERY IN PROGRESS/PERSISTENT SESSIONS ACTIVE, which is represented by block 108. This signal causes the switching of sessions to the take-over task. The actual sequence of operations is to suspend all sessions of the logical unit; to disconnect logical unit resources from the current task associated with the access method control block (ACB); to connect logical unit resources to the ACB of the take-over task; to notify the session monitor that recovery is in progress; and to return an indication that the logical unit is persistent to the take-over task.

If a CLOSE signal is issued in state 3, there is a transition to state 4, RECOVERY PENDING, represented by block 106. Transitioning to this state results in close processing for suspension of sessions. This causes suspension of all sessions of the logical unit, the discard of queued session requests, the discard of queued request units (RU) if data queueing is not in effect, the switch of logical unit resources from the closing access method control block (ACB) to VTAM, the notification of RECOVERY PENDING state to the session monitor, and the start of the safety timer.

The RECOVERY PENDING state (state 4) represented by block 106, is entered when another recovery (ALTERNATE) instance of the logical unit does not exist. While in this state, VTAM will "track" all active sessions as well as handle communications events that relate to these sessions as, for example, the receipt of an unbind request. An OPEN signal issued when in state 4 will initiate take-over of the suspended sessions and cause a transition to state 5, RECOVERY IN PROGRESS/PERSISTENT SESSIONS ACTIVE, block 108. The specific steps followed are to connect logical unit resources to the ACB of a take-over task, to notify the session monitor that recovery is in progress, to return an indication that the logical unit is persistent to the take-over task and to reset the safety timer. The TIMEOUT signal is generated when the safety timer expires. A TIMEOUT signal forces the logical unit from state 4 back to state 0, the RESET state, represented by block 100. Therefore, following a TIMEOUT, all sessions are terminated, and any subsequent OPEN signal causes a fresh instance of the logical unit to be established.

When in state 5, RECOVERY IN PROGRESS/PERSISTENT SESSIONS ACTIVE, represented by block 108, the logical unit has been activated and the persistent session capability is active. The application may create, use, and terminate sessions. In addition, the application is expected to take actions on all sessions that are suspended on its behalf. The possible actions are resuming session activity or terminating the session. The logical unit is considered in the "recovery-in-progress" state until the last suspended session has been acted upon. When the last session is recovered, a recovery complete (REC COMP) signal changes the state to state 3, LOGICAL UNIT ACTIVE/PERSISTENT SESSIONS ACTIVE, block 104.

If, for some reason, the recovering application does not process a session, the session will remain suspended. However, since the session monitor is aware that the logical unit is in a "recovery-in-progress" state, the network operator can terminate sessions that had been suspended an inordinately long period of time.

If a failure occurs while in state 5, all the sessions of the logical unit will still be preserved and will again be marked suspended. This is indicated by the OPEN signal which keeps the logical unit in state 5. A CLOSE signal issued while in state 5 will cause a transition to state 4, RECOVERY PENDING, block 106, performing close processing for the suspension of sessions in the same way as was done by the CLOSE signal which caused a transition from state 3 to state 4. The persistent session capability can be deactivated while in state 5, and will cause a transition to state 6, RECOVERY IN PROGRESS/PERSISTENT SESSIONS INACTIVE, represented by block 110. While in state 6, the logical unit is taking recovery actions to resume its suspended sessions as was done in state 5. However, if the logical unit fails while in this state, normal termination processing is executed and all sessions are unbound. Besides a CLOSE signal, a PERSIST signal or a REC COMP signal can also be issued while in state 6. A PERSIST signal causes a transition back to state 5. A REC COMP causes a transition back to state 2, LOGICAL UNIT ACTIVE/PERSISTENT SESSIONS INACTIVE. The REC COMP signal indicates that all session recovery actions for the logical unit have been completed which means that the recovery logical unit instance has taken the appropriate actions on all sessions that have been suspended on behalf of the logical unit. An attempt to issue an OPEN signal while in state 6 will result in an error message (FIG. 3) and the logical unit will remain in that state.

While the invention has been particularly shown and described with reference to the particular embodiment thereof, it will be understood by those skilled in the art that various changes in form and details may be made therein without departing from the spirit and scope of the invention.

Having thus described our invention, what we claim and desire to secure as Letters Patent is as follows:

1. A method for preserving application sessions between pairs of communicating logical units located at a plurality of nodes in a computer network, said computer network having a telecommunications access method program to control communication between network resources and a session monitor to interface with an operator, the method comprising the steps of:
    activating a persistent sessions capability at one of the logical units;
    suspending the active sessions of the logical unit;
    maintaining the status of the suspended sessions during the recovery phase;
    initiating recovery actions to resume the suspended sessions;
    switching the suspended sessions to a take-over task; and
    resuming session activity on at least one of the suspended sessions.

2. A method as claimed in claim 1 including the step of notifying the session monitor that the application system is in a recovery pending state.

3. A method as claimed in claim 2 further including the step of activating a safety timer when all suspended active sessions have been placed into a recovery pending state.

4. A method as claimed in claim 3 further including the step of terminating all suspended sessions if the safety timer expires before the application sessions have recovered.

5. A method as claimed in claim 1 including the step of terminating at least one of the suspended sessions.

6. A method as claimed in claim 1 including the step of notifying the session monitor that the recovery of the application sessions is complete.

7. A method as claimed in claim 1 wherein the step of switching the suspended sessions to a take-over task includes:
    disconnecting logical unit resources from the current task;
    connecting logical unit resources to the take-over task;
    notifying the session monitor that session recovery is in progress; and
    returning an indication that the logical unit is persistent to the take-over task.

8. A method as claimed in claim 1 wherein the step of maintaining the suspended sessions during the recovery phase further includes:
    keeping all session resources allocated;
    tracking and preserving session states for subsequent resynchronization with the application system during recovery actions; and
    handling all session requests that occur during the outage period.

9. A method as claimed in claim 8 wherein the step of maintaining suspended sessions during the recovery phase further includes discarding actual application data received on a given session during the outage period.

10. A method as claimed in claim 9 wherein the step of maintaining suspended sessions during the recovery phase further includes queueing the application data received on a given session during the outage period in a data space for subsequent processing.

11. A method for preserving application sessions between pairs of network nodes in a computer network in which the nodes are characterized by associated logical units and the network controls access to, and communication between, resources by a telecommunications access method software program, the method comprising:

- activating a persistent sessions capability by at least one of the communicating logical units in the network;
- suspending the application sessions of the logical unit;
- maintaining the status of suspended sessions during the recovery phase;
- restarting the application system at the logical unit;
- resuming ownership of the suspended application sessions at the logical unit; and
- reporting the status of the suspended sessions to the application.

12. A method as claimed in claim 11 wherein the step of maintaining the suspended sessions during the recovery phase further includes:

- keeping all session resources allocated;
- tracking and preserving session states for subsequent resynchronization with the application system during recovery actions; and
- allowing suspended sessions to be terminated during the outage period.

13. A method as claimed in claim 12 wherein the step of maintaining suspended sessions during the recovery phase further includes discarding actual application data received on a given session during the outage period.

14. A method as claimed in claim 13 wherein the step of maintaining suspended sessions during the recovery phase further includes queueing the application data received on a given session during the outage period in a data space for subsequent processing.

15. A method for controlling application sessions between network nodes in a computer network, each of said nodes having at least one associated logical unit with access to the network controlled by a telecommunication access method program, the method comprising:

- activating a persistent sessions capability at the network node logical unit running the application system;
- suspending the application sessions at the logical unit;
- maintaining the suspended sessions during application system recovery attempts;
- attempting recovery of the application system and suspended sessions;
- resuming session activity if recovery attempts are successful;
- deactivating persistent sessions capability if recovery attempts are unsuccessful; and
- executing termination processing if persistent sessions capability is deactivated.

16. A method as claimed in claim 15 wherein the step of attempting recovery of the application system and suspended sessions includes restarting the application system at the logical unit.

17. A method as claimed in claim 16 wherein the step of attempting recovery of the application system and suspended sessions includes switching the suspended sessions to a take-over task in the primary processor system.

18. A method as claimed in claim 16 wherein the step of attempting recovery of the application system and suspended sessions includes switching the suspended sessions to a take-over task in an alternate processor system.

19. An apparatus for retaining application sessions between a pair of communicating logical units located at a plurality of nodes in a computer network wherein a network application system is running at one of said communicating logical units, said apparatus comprising:

- means for activating a persistent sessions capability at the logical unit running the application system;
- means for suspending the application sessions between said logical units;
- means for maintaining the status of the suspended sessions during the recovery period;
- means for initiating recovery actions and resuming the suspended application sessions;
- means for switching the suspended sessions to a take-over task; and
- means for resuming the application sessions between said logical units.

20. An apparatus as claimed in claim 19 wherein the means for switching the suspended sessions to a take-over task includes link means for communications access to an alternate processor system.

21. An apparatus for retaining application sessions between a pair of communicating logical units located at a plurality of nodes in a computer network wherein a network application system is running at one of said communicating logical units, said apparatus comprising:

- means for activating a persistent sessions capability at the logical unit running the application system;
- means for suspending the application sessions between said logical units;
- means for maintaining the status of the suspended sessions during the recovery period;
- means for restarting the application system;
- means for resuming ownership of the suspended application sessions at the affected logical unit; and
- means for reporting the status of the suspended sessions to the application system.

* * * * *